(12) United States Patent
Glaser et al.

(10) Patent No.: US 6,597,088 B1
(45) Date of Patent: Jul. 22, 2003

(54) SPARK PLUG WITH PRESSURE MEASURING DEVICE

(75) Inventors: Josef Glaser, Graz (AT); Gernot Leuprecht, Graz (AT)

(73) Assignee: AVB List GmbH, Graz (AU)

( * ) Notice: Subject to any disclaimer, the term of this patent is extended or adjusted under 35 U.S.C. 154(b) by 177 days.

(21) Appl. No.: 09/634,944

(22) Filed: Aug. 7, 2000

(30) Foreign Application Priority Data

Aug. 5, 1999 (AT) .............................................. 1349/99

(51) Int. Cl.[7] .......................... F02M 57/06; F02P 13/00; H01T 13/00
(52) U.S. Cl. .................... 313/118; 313/141; 313/137; 313/143; 313/144; 313/118; 123/169 EL; 123/169 E; 75/115
(58) Field of Search ................................ 313/141, 137, 313/143, 144, 118; 73/115; 123/169 EL, 169 E, 169 CA

(56) References Cited

U.S. PATENT DOCUMENTS

| 3,745,400 A | * | 7/1973 | Meyer | 313/144 |
|---|---|---|---|---|
| 3,790,842 A | * | 2/1974 | Westenkirchner et al. | 313/118 |
| 3,878,418 A | * | 4/1975 | Meyer | 313/118 |
| 3,882,338 A | * | 5/1975 | Meyer | 313/11.5 |
| 4,736,718 A | * | 4/1988 | Linder | 123/267 |
| 4,771,209 A | * | 9/1988 | Ryan | 313/140 |
| 4,969,353 A | * | 11/1990 | Steinke | 73/115 |
| 5,479,817 A | * | 1/1996 | Suzuki et al. | 123/143 C |
| 6,094,990 A | * | 8/2000 | Lykowski et al. | 73/35.12 |
| 6,204,594 B1 | * | 3/2001 | Ingham | 313/118 |

FOREIGN PATENT DOCUMENTS

| AT | 402116 | 2/1997 |
|---|---|---|
| DE | 3514597 | 10/1986 |
| EP | 441157 | 8/1991 |
| WO | 9731251 | 8/1997 |

* cited by examiner

Primary Examiner—Ashok Patel
Assistant Examiner—Holly Harper
(74) Attorney, Agent, or Firm—Dykema Gossett PLLC

(57) ABSTRACT

In a spark plug, whose shell is provided with an eccentrically positioned, full-length, longitudinal bore designed to hold an insulating element, parts of the shell having varying wall thicknesses and a pressure measuring device being located in a part of greater wall thickness. In order to simplify connection with the ignition cable or coil, respectively, and to avoid breakage of the insulator, the spark plug insulator is configured as a multi-piece element and comprise at least an upper piece carrying the high voltage connector, a lower piece adjacent to the combustion chamber, and an insulating intermediate element of flexible material, which is placed between the upper and the lower piece of the insulator.

11 Claims, 4 Drawing Sheets

SPARK PLUG WITH PRESSURE MEASURING DEVICE

BACKGROUND OF THE INVENTION

The invention relates to a spark plug with a full-length longitudinal bore which is designed to hold an insulating element and is positioned eccentrically in the shell, the shell having regions of varying wall thicknesses and a pressure measuring device being incorporated in a region of greater wall thickness.

DESCRIPTION OF THE PRIOR ART

A quantity essential for the assessment of the combustion process in an internal combustion engine is the pressure prevailing in the combustion chamber. Research and development, engine management and engine control systems require a means for measuring pressure in the combustion chamber. Usually it is desirable to obtain pressure measurements without the necessity of an additional bore in the combustion chamber. One possibility of achieving this aim is to adapt the spark plug for an additional pressure measuring function.

The known devices of this kind may essentially be classified in two groups. A first group uses so-called force measuring disks, which are used instead of a sealing washer or are mounted at the site of the seal of the spark plug and measure the pressure acting on the plug as a change in sealing force. A disadvantage of such a system lies in the fact that the plug shell and the threaded bore holding the spark plug are subject to different deformations due to temperature differences during the operation of the engine, which deformations will immediately act on the force measuring element and will cause significant measurement errors.

The second group uses pressure measuring elements which are contained in the shell of the spark plug, problems in this case being due to the restricted space available for the pressure measuring elements in this area.

In order to obtain more space for the pressure measuring element pressure measuring spark plugs have been developed, whose longitudinal bore for the insulator has been positioned eccentrically in the spark plug shell, thus creating a region of lesser and one of greater wall thickness, the pressure measuring element being placed in the latter.

Multiple variants of insulating elements that are placed asymmetrically in the spark plug shell have been described in EP 0 441 157 A. If the ignition cable or coil connector is to be centrally fitted, a cranked adapter part is required in these instances. Due to the change in the position of the high voltage connector considerable costs for the adapter are incurred, especially in the case of ignition coils, which singly or conjointly are placed directly above the spark plugs—a design occurring with increasing frequency. Furthermore, for a given diameter of the spark plug shell, the insulator must be of a more slender design, which will increase the probability of insulator breakage when such pressure measuring spark plugs are screwed into the cylinder head. Transverse forces exerted by the screwing tool used may be particularly detrimental. The insulator may also be damaged by the fitting forces arising when the plug connector is fitted or when the coil is mounted. Another source of damage to the insulator, which may result in insulator breakage, is due to the inertial forces exerted by plug connector plus cable, which are caused by accelerations during operation of the engine.

A spark plug of the above type is presented in DE 35 14 597 A1. With this spark plug the longitudinal bore is positioned in the shell eccentrically. This will result in a part of the shell with greater wall thickness, in which a pressure sensor is positioned in a stepped bore normal to the axis of the spark plug, the pressure sensor being directly connected with the combustion chamber. Via a sack bore parallel with the axis of the spark plug, which opens into a bore running at an angle thereto in the shell, the electrical signal leads of the pressure sensor are carried to an external evaluation unit. In a second variant a stepped bore is formed parallel with the spark plug axis in the thicker-walled part of the shell, which bore contains a pressure sensor and a sleeve-shaped pressure fitting. With this configuration the pressure sensing device can only be dismounted after removal of the insulating body.

From AT 402 116 B a spark plug is known which includes a force measuring element for determination of the pressure acting on the spark plug. If pressure is applied in axial direction the insulating body of the spark plug is resting against the spark plug shell via the force measuring element. In a special variant the insulating body is divided to reduce the mass coupled to the force measuring element, i.e., into a part on the side of the combustion chamber, which is supported by the force measuring element, and a part on the side of the ignition cable, which is directly attached to the shell. With the use of an electrically conductive intermediate piece the two parts of the inner electrode on the side of the combustion chamber and on the side of the cable, respectively, will also be mechanically decoupled to a large extent. An insulating sleeve is provided between the two parts of the insulating body.

SUMMARY OF THE INVENTION

It is an object of this invention to further develop a spark plug including a pressure measuring device of the above type such that the fitting dimensions of a conventional spark plug are obtained while insulator breakage is avoided.

According to the invention this object is achieved by providing that the spark plug insulator be configured as a multi-piece element and comprise at least one upper piece carrying the high voltage connector and one lower piece adjacent to the combustion chamber, and that an insulating intermediate element of flexible material be placed between the upper and the lower piece of the insulator.

By configuring the insulator in two pieces and placing an insulating intermediate element of flexible material between the upper and lower insulator piece, harmful material stresses due to mounting or acceleration forces may be avoided in the slender lower part of the insulator, thus more or less eliminating the danger of breakage. Fitting and accelerating forces may be taken up by the comparatively thick-walled upper piece of the insulator, as the invention provides that at least the high voltage connector and the part of the upper insulator piece facing the high voltage connector should be radially symmetric to the spark plug axis and should have fitting dimensions essentially corresponding to the respective parts of a conventional spark plug. A pressure-measuring spark plug according to the state of the art, with an asymmetrically positioned insulating body, will exhibit significantly lesser wall thicknesses in its upper region, in addition to requiring a cranked adapter piece for fitting of the ignition cable connector or the ignition coil.

The intermediate element is preferably made from a high-temperature resistant elastomer, such as a silicone rubber or a fluoroelastomer. The upper piece of the insulator may be made from plastic or, like the lower piece, from ceramic material.

Since the upper piece of the insulator has fitting dimensions identical with that of a conventional spark plug, no additional cost is incurred for adapting the ignition cable or coil connection. This is of particular advantage in the case of coils which singly or conjointly are placed directly above the spark plugs.

Since, according to the invention, the lower piece of the insulator is protected inside the spark plug shell, a very slender design may be chosen, which will leave ample room for a pressure measuring device in the region of greater wall thickness of the spark plug shell, next to the lower insulator piece.

It is of particular advantage to provide a lateral bore for the pressure measuring device, which is situated in the region of greater wall thickness next to lower piece of the insulator and forms an angle of 0° to 15°, and preferably 4° to 12°, with the spark plug axis. A slight inclination of the bore will facilitate mounting and dismounting of the pressure measuring device.

In a first embodiment of the invention the pressure measuring device is configured as a probe held in the lateral bore. In a second embodiment it is provided that the pressure measuring device comprise a pressure measuring element seated in a recess of the shell adjacent to the combustion chamber and a signal lead guided in a lateral bore.

According to the invention the pressure measuring element may be configured in a known manner as a piezoelectric element subject to pressure by a sensor membrane, the central axis of the sensor membrane preferably running essentially normal to the axis of the lateral bore. Although other orientations of the sensor membrane would be possible, i.e., directly towards the combustion chamber, the orientation of the membrane axis normal to the axis of the lateral bore will permit a relatively large diameter to be selected for the sensor membrane, thus improving measurement.

One of the advantages of the design with an integrated measuring element over that with a probe is that the slender signal lead and the flat measuring element will permit the use of a smaller thread for the pressure-measuring spark plug. In the variant featuring a probe the lower limit of the spark plug thread is reached with the thread dimension M 14 due to the 4 mm diameter of the probe. Probes of greater slenderness are not desirable from a measuring point of view and are difficult to manufacture.

Finally, it is an advantage according to the invention if the axis of the lower piece of the insulator is inclined towards the spark plug axis, such that the tip of the spark plug is brought close to the spark plug axis. Due to the asymmetrical arrangement of the longitudinal bore in the spark plug shell the center electrode of the spark plug usually will not coincide with the spark plug axis. This off-position may be reduced by inclining the axis of the lower insulator piece relative to the spark plug axis.

BRIEF DESCRIPTION OF THE DRAWINGS

This invention will now be further described with reference to the accompanying drawings, in which.

DETAILED DESCRIPTION OF THE PREFERRED EMBODIMENTS

Figure 1:
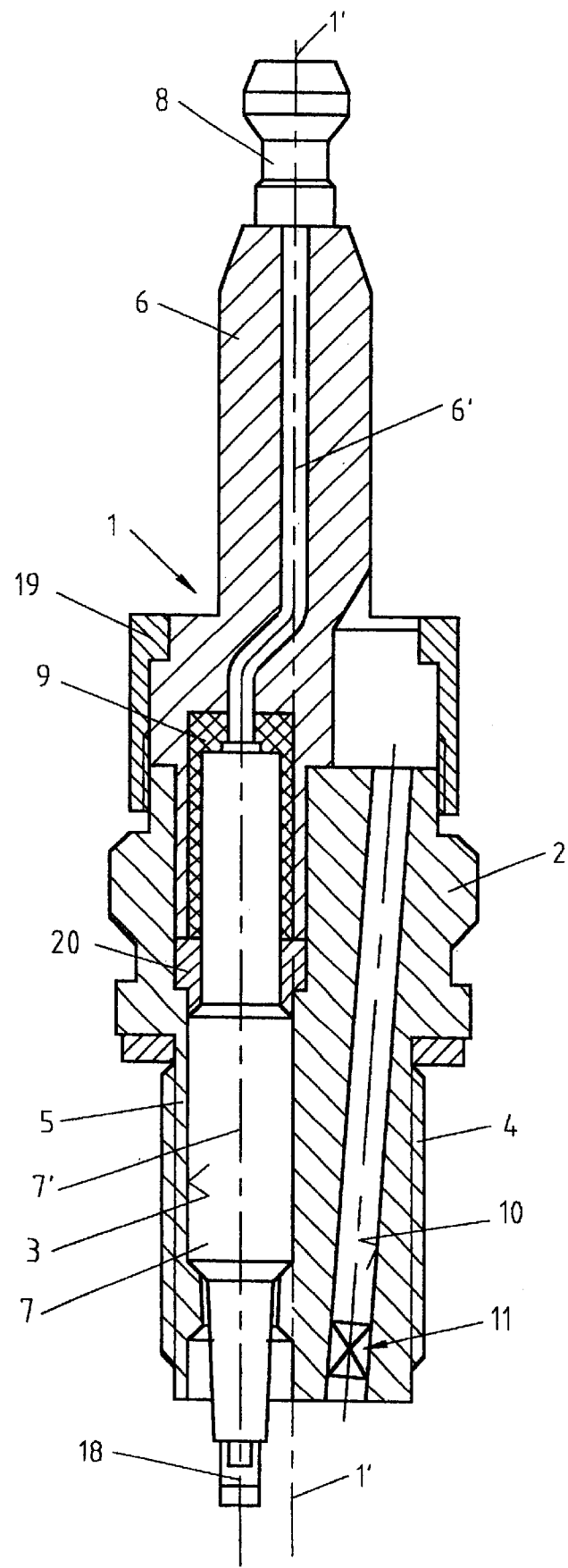
FIG. 1 shows a longitudinal section of a spark plug according to the invention, in which a pressure measuring device is integrated.
Figure 4:
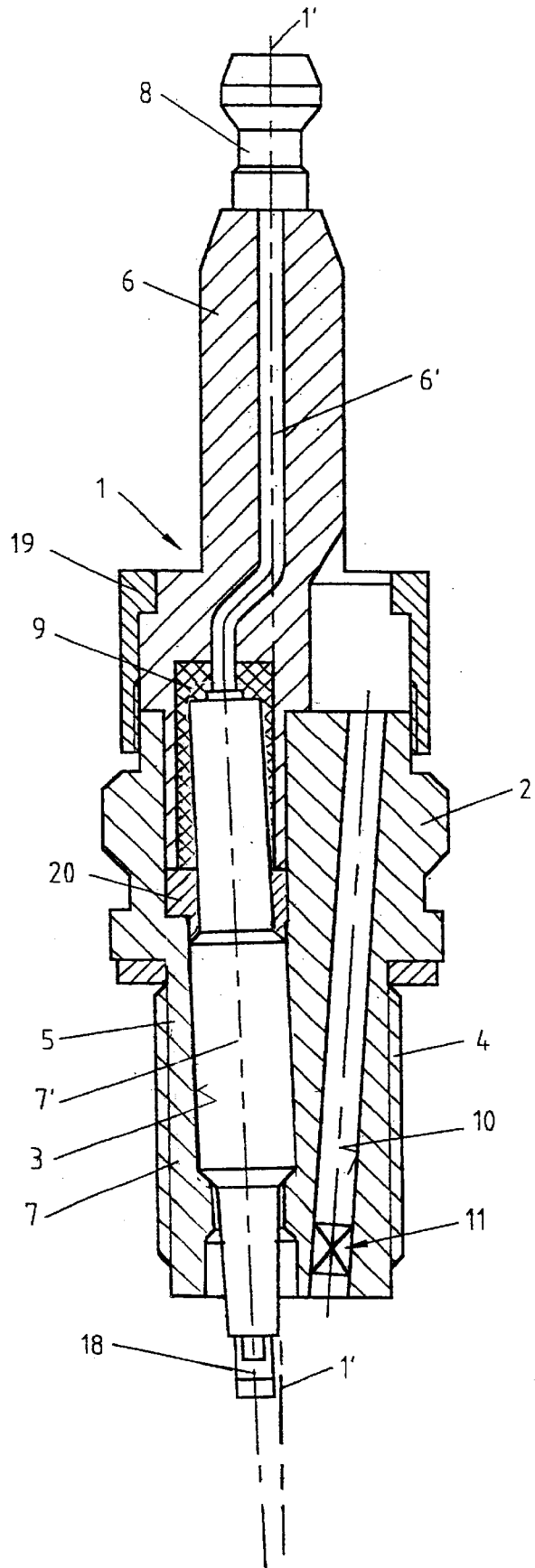
FIG. 4 shows another variant of the invention wherein a lower isulator piece of the spark plug is inclined towards a central axis such that the spark plug tip is brought close to the spark plug axis.

The first variant presented in FIG. 1 shows a spark plug 1 with a longitudinal through bore 3, positioned eccentrically in the shell 2. Due to the eccentrical position of the longitudinal bore 3, the shell will have regions with varying wall thicknesses, the region with the greater wall thickness bearing reference numeral 4 and that with the lesser wall thickness 5. The spark plug insulator is configured as a multi-piece element featuring an upper piece 6 carrying a high voltage connector 8 and a lower piece 7 adjacent to the combustion chamber. Between the upper insulator piece 6 and the lower insulator piece 7 an insulating intermediate element 9 of flexible material is placed, which is made from high-temperature resistant elastomer material such as a silicone rubber or a fluoroelastomer. The axis 7' of the lower insulator piece 7 is at a distance from the axis 1' of the spark plug, but as shown in FIG. 4 may be inclined thereto so that the spark plug tip 18, or rather, its center electrode, is brought close to the spark plug axis 1'.

The axis 6' of the upper insulator piece 6 coincides with the spark plug axis 1', so that the upper piece 6, or rather, that part of the upper piece which is used for fitting the spark plug connector or the coil, can be configured radially symmetrical and essentially identical to that of a conventional spark plug. This will permit use of the spark plug of the invention without any auxiliary means or adapter parts.

In the region 4 of greater wall thickness of the shell 2 a lateral bore 10 is provided next to the lower insulator piece 7, which bore 10 is designed to hold a pressure measuring device 11 and runs parallel with the spark plug axis 1' or forms an angle of up to 15° with the axis 1'. Preferably angles of 4° to 12° are used, as a slight inclination of the bore will allow full use of the space available within the shell and facilitate mounting and dismounting of the pressure measuring device 11. For example, after removal of the cap 19 by means of which the upper insulator piece 6 is fastened to the shell 2, for instance by a threaded assembly, the bore 10 will become accessible. The lower insulator piece 7 is held in the shell 2 by means of the insulator screw 20.

Figure 2:
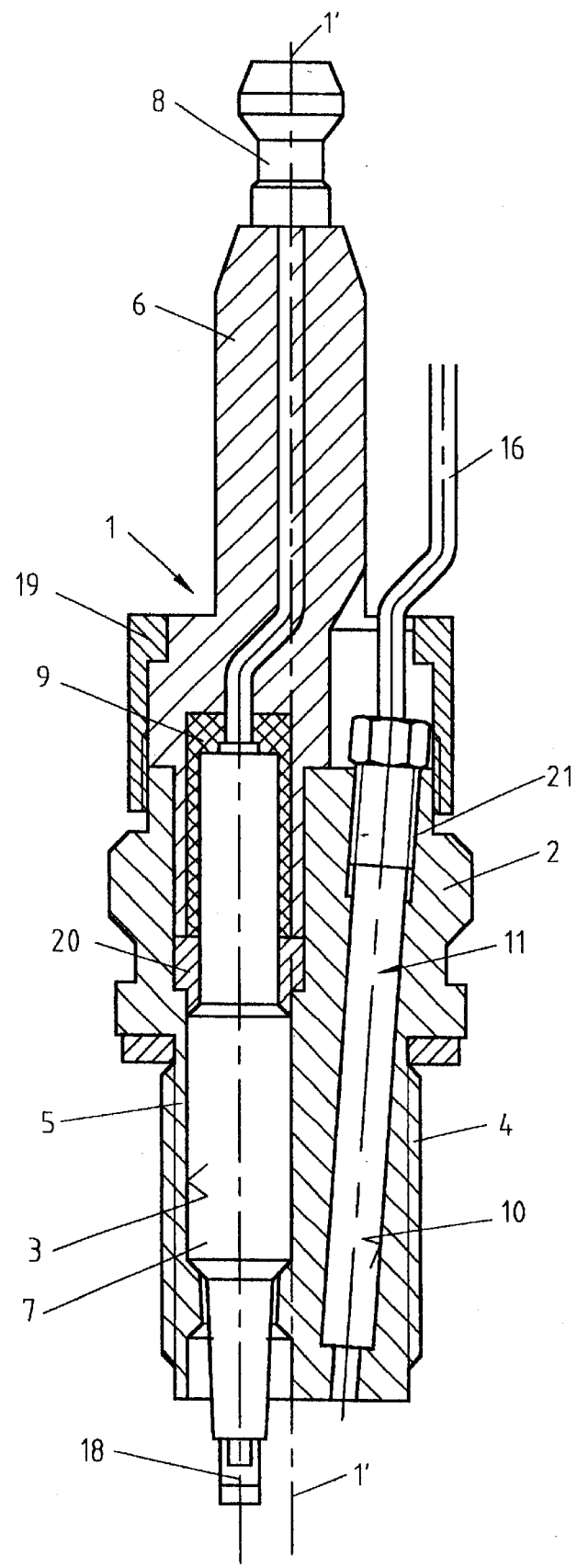
FIGS. 2 and 3 show variants of the invention, the sectional representation corresponding to that in FIG. 1.
Figure 3:
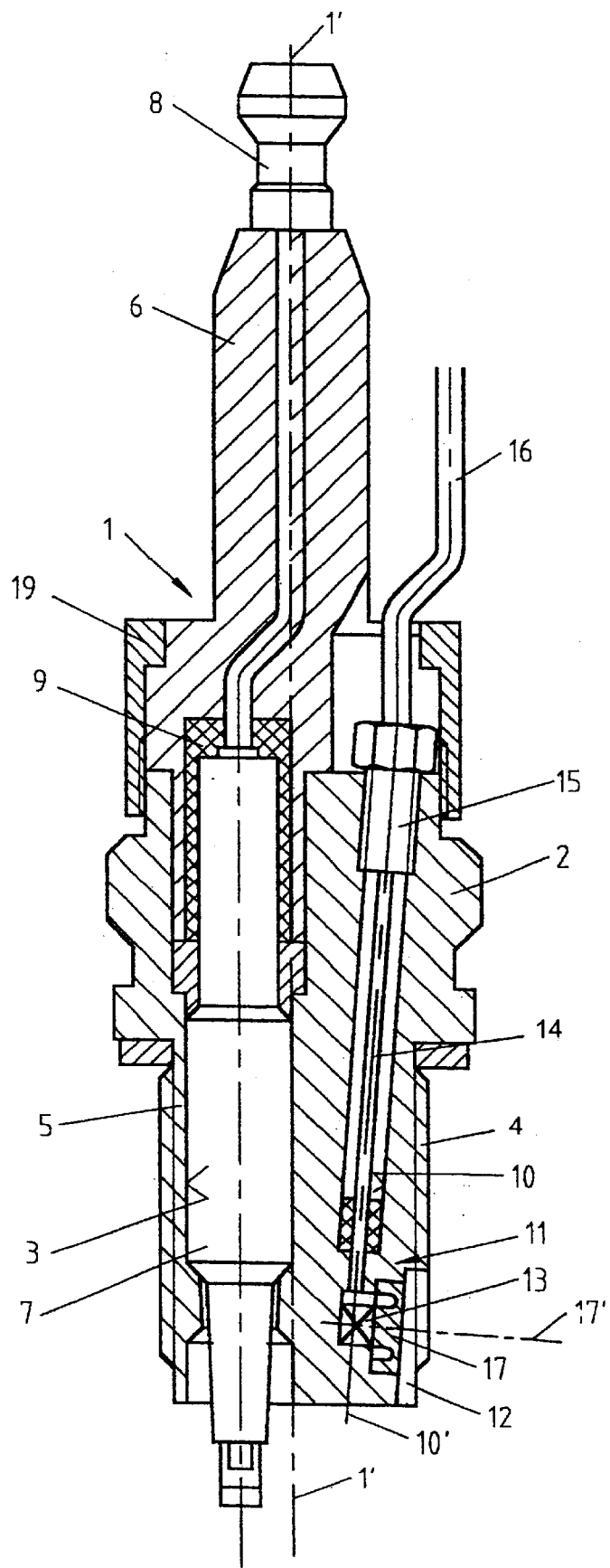

In the embodiments of FIGS. 2 and 3 identical or analogous parts bear the same reference numerals. Thus the variant according to FIG. 2 shows a pressure measuring device 11, which is configured as a probe to be inserted into the bore 10. The probe may be mounted in the shell 2 for instance by means of thread 21 at the end of the bore facing away from the spark plug tip. After removal of the cap 19 and unscrewing of the threaded mount 21 the probe may be extracted from the bore 10 may means of the signal lead 16.

In the variant presented in FIG. 3 the pressure measuring device 11 shows a pressure measuring element 13 sitting in a recess 12 of the spark plug shell 2 on the side of the combustion chamber. The recess 12 is directly connected with the combustion chamber of the internal combustion engine. The signal lead 14 is held in the lateral bore 10 and connects the pressure measuring element 13 to a fitting 15 for the measuring cable 16.

The pressure measuring element 13 incorporates a piezoelectric element which is subjected to pressure by a sensor membrane 17, the central axis 17' of the sensor membrane 17 being essentially normal to the axis 10' of the bore 10 in the embodiment shown. The invention would of course also permit other orientations of the sensor membrane, which might for instance face directly downwards towards the combustion chamber.

What is claimed is:

1. A spark plug with a full-length longitudinal bore which is designed to hold an insulator and is positioned eccentrically in a shell of said spark plug, said shell having regions of varying wall thicknesses and a pressure measuring device being situated in a region of greater wall thickness, wherein said insulator of said spark plug is configured as a multi-piece element and comprises at least an upper insulator piece carrying a high voltage connector and a lower insulator piece adjacent to a combustion chamber, and wherein an insulating intermediate element of flexible material is placed between said upper insulator piece and said lower insulator piece.

2. A spark plug as claimed in claim 1, wherein said intermediate element is made from high-temperature resistant elastomer material.

3. A spark plug as claimed in claim 2, wherein said elastomer material is a silicone rubber or a fluoroelastomer.

4. A spark plug as claimed in claim 1, wherein at least said high voltage connector and a part of said upper insulator piece facing said high voltage connector are radially symmetric to the central spark plug axis and have fitting dimensions essentially corresponding to respective parts of a conventional spark plug.

5. A spark plug as claimed in claim 1, wherein the axis of said lower insulator piece is inclined towards the central spark plug axis, such that the spark plug tip is brought close to said spark plug axis.

6. A spark plug as claimed in claim 1, wherein in said shell a lateral bore is provided, which is designed to hold said pressure measuring device, and is situated in said region of greater wall thickness next to said lower insulator piece forming an angle of 0° to 15° with the central spark plug axis.

7. A spark plug as claimed in claim 6, wherein said lateral bore forms an angle of 4° to 12° with said central spark plug axis.

8. A spark plug as claimed in claim 6, wherein said pressure measuring device is configured as a probe held in said lateral bore.

9. A spark plug as claimed in claim 6, wherein said pressure measuring device comprises a pressure measuring element seated in a recess of said shell adjacent to said combustion chamber and a signal lead carried in a lateral bore situated in said region of greater wall thickness.

10. A spark plug as claimed in claim 9, wherein said pressure measuring element is configured as a piezoelectric element subject to pressure from a sensor membrane having a central axis.

11. A spark plug as claimed in claim 10, wherein said central axis of said sensor membrane running essentially normal to the central axis of said lateral bore.

\* \* \* \* \*

UNITED STATES PATENT AND TRADEMARK OFFICE
CERTIFICATE OF CORRECTION

PATENT NO.    : 6,597,088 B1
DATED         : July 22, 2003
INVENTOR(S)   : Josef Glaser and Gernot Leuprecht It is certified that error appears in the above-identified patent and that said Letters Patent is hereby corrected as shown below:

<u>Title page,</u>
Please insert -- [73] Assignee: AVL List GmbH, Graz (AT) --

Signed and Sealed this

Sixteenth Day of September, 2003

JAMES E. ROGAN
*Director of the United States Patent and Trademark Office*